(12) United States Patent
Zheng et al.

(10) Patent No.: US 9,281,521 B2
(45) Date of Patent: Mar. 8, 2016

(54) GRAPHITE NEGATIVE MATERIAL FOR LITHIUM-ION BATTERY, METHOD FOR PREPARING THE SAME AND LITHIUM-ION BATTERY

(71) Applicant: Microvast New Materials (Huzhou) Co., Ltd., Huzhou, Zhejiang Province (CN)

(72) Inventors: Zhuoqun Zheng, Huzhou (CN); Tianshu Deng, Huzhou (CN); Yunhua Nie, Huzhou (CN); Xiaoping Zhou, Huzhou (CN)

(73) Assignee: MICROVAST POWER SYSTEMS CO., LTD., Huzhou, Zhejiang Province (CN)

( * ) Notice: Subject to any disclaimer, the term of this patent is extended or adjusted under 35 U.S.C. 154(b) by 0 days.

(21) Appl. No.: 13/862,341

(22) Filed: Apr. 12, 2013

(65) Prior Publication Data

US 2014/0087267 A1    Mar. 27, 2014

(30) Foreign Application Priority Data

Sep. 22, 2012  (CN) .......................... 2012 1 0362238
Jan. 9, 2013   (CN) .......................... 2013 1 0008218

(51) Int. Cl.
| | |
|---|---|
| *H01M 4/583* | (2010.01) |
| *C01B 31/04* | (2006.01) |
| *H01M 4/04* | (2006.01) |
| *H01M 4/587* | (2010.01) |

(52) U.S. Cl.
CPC ............... *H01M 4/583* (2013.01); *C01B 31/04* (2013.01); *H01M 4/049* (2013.01); *H01M 4/0492* (2013.01); *H01M 4/587* (2013.01)

(58) Field of Classification Search
None
See application file for complete search history.

(56) References Cited

U.S. PATENT DOCUMENTS

2009/0208780 A1 * 8/2009 Sun et al. .......................... 429/12
2012/0149551 A1   6/2012 Gaillard et al.

FOREIGN PATENT DOCUMENTS

| CN | 1812168 A | 8/2006 |
|---|---|---|
| CN | 1851963 A | 10/2006 |
| CN | 1885598 A | 12/2006 |
| CN | 101087021 A | 12/2007 |
| CN | 101355150 A | 1/2009 |
| CN | 101908627 A | 12/2010 |

* cited by examiner

*Primary Examiner* — Ladan Mohaddes
(74) *Attorney, Agent, or Firm* — Cheng-Ju Chiang

(57) ABSTRACT

A graphite negative material for a lithium-ion battery includes a number of graphite layers parallel to each other. A number of channels are through the graphite layers. And the channels are capable of allowing lithium ions to pass therethrough freely. A method for preparing the graphite negative material and a lithium-ion battery including the graphite negative material are also provided.

13 Claims, 7 Drawing Sheets

GRAPHITE NEGATIVE MATERIAL FOR LITHIUM-ION BATTERY, METHOD FOR PREPARING THE SAME AND LITHIUM-ION BATTERY

FIELD OF THE INVENTION

The present invention relates to a lithium-ion battery, and particularly to a graphite negative material for a lithium-ion battery, a method for preparing the same and a lithium-ion battery with the same.

BACKGROUND OF THE INVENTION

Since Sony Corporation of Japan took the lead in development and commercialization of a lithium-ion battery in 1991, the lithium-ion battery has been rapidly developed and widely used. The lithium-ion battery has advantages of high operating voltage, high energy density, long cycle life, low self-discharge current, and having no memory effect. Thus, currently, the lithium-ion battery has become a preferred chemical power source of a high-grade consumer electronic product.

Currently, a negative electrode of the lithium-ion battery is usually made of a graphite material, because the graphite material has advantages of good reversibility of intercalation/deintercalation of lithium ions, low potential plateau and excellent charge-discharge cycle performance. However, the lithium ions passing in and out of a graphite layer must be from edges of the graphite layer, i.e. along a direction parallel to the graphite layer. A diffusion coefficient of the lithium ions passing in and out of the graphite layer is small, which severely restricts the high-rate charge-discharge performance of the lithium-ion battery. When the lithium-ion battery is charged-discharged at high current density, the lithium ions can not diffuse into the graphite interlayer of the negative electrode in time. The lithium ions will concentrate on the surface of the negative electrode and are reduced to an active metal lithium crystallite or a big lithium dendrite. The metal lithium crystallite is prone to react with an electrolyte of the lithium-ion battery to generate heat and gas, meanwhile lead to capacity reduction, thereby severely shortening the cycle life of the lithium-ion battery. The lithium dendrite may cause an internal short circuit of the lithium-ion battery, thereby bringing security risks.

Currently, the graphite material can be modified by a surface oxidation and reduction treatment, a doping treatment or a coating treatment. Chinese Patent No. CN 200610060814.X (Zhanjiang Juxin electronic material Co., Ltd., China) and Chinese Patent No. CN 200610061625.4 (Shenzhen Beiterui material Co., Ltd., China) disclose composite graphite particles formed by bonding natural graphite powder and artificial graphite powder together with an adhesive. The composite graphite particles include nanopores and sub-micron pores. The nanopores and sub-micron pores provide more channels for the lithium ions passing in and out of the graphite layer, thereby improving the cycling stability of the lithium-ion battery. Wu, Zhuangxiong (Chinese Patent No. CN 201010246172.9) discloses a method for preparing a graphite material with nanopores. In the method, an additive and a pore-forming agent are added into a coke and the graphite material is prepared at a high temperature (1600~3000° C.). Although a certain amount of pores can be generated in the graphite material by using the method, the graphite material prepared by using the method still has big graphite crystals, and a ratio of an area of a graphite layer to an area of a graphite layer section perpendicular to the graphite layer is still too large. Thus, the graphite material can not be used at high current density.

SUMMARY OF THE INVENTION

The present invention is directed to a graphite negative material for a lithium-ion battery, which has a number of channels through a number of graphite layers. The channels are capable of allowing lithium ions to pass therethrough freely.

The present invention is also directed to a method for preparing the graphite negative material for the lithium-ion battery. The graphite negative material prepared by the method has a number of channels through a number of graphite layers. The channels are capable of allowing lithium ions to pass therethrough freely.

The present invention is further directed to a lithium-ion battery using the graphite negative material, which has improved cycle stability and high rate charge-discharge performance.

The present invention provides a graphite negative material for a lithium-ion battery including a number of graphite layers parallel to each other. A number of channels are through the graphite layers. The channels are capable of allowing lithium ions to pass therethrough freely.

In one embodiment of the present invention, a diameter of each of the channels is in a range from 0.2 nm to 1.5 μm.

The present invention also provides a method for preparing the graphite negative material. At first, a catalyst is loaded on a graphite material including a number of graphite layers to form a graphite material loading the catalyst. And then, the graphite material loading the catalyst is reacted with a reaction gas to transform the carbon of the graphite material to a gaseous product, and to form a number of channels through the graphite layers, the channels are capable of allowing lithium ions to pass therethrough freely. The catalyst includes at least one selected from a group consisting of Ti, Zr, V, Nb, Cr, Mo, W, Mn, Fe, Ru, Co, Rh, Ir, Ni, Pd, Pt, Cu, Ag, Au, Zn, Gd, Na, K, Mg, Ca, Sr, Ba, Al, Ga, In, Sn, Sb, Bi and a compound thereof.

In one embodiment of method of the present invention, the graphite material includes at least one selected from a group consisting of natural graphite, artificial graphite, graphitized meso-carbon microbead (MCMB) and modified graphite.

In one embodiment of the present invention, the catalyst includes at least one selected from a group consisting of Ti, Zr, V, Nb, Cr, Mo, W, Mn, Fe, Ru, Co, Rh, Ir, Ni, Pd, Pt, Cu, Ag, Au, Zn, Gd and compounds thereof. Further, the catalyst includes at least one selected from a group consisting of Mn, Fe, V, Zn, Co, Cu, Ni and a compound thereof.

In one embodiment of the present invention, the compound is at least one selected from a group consisting of oxide, hydroxide, halide, nitrate, sulfate, carbonate, metallic acid salt and organic acid salt.

In one embodiment of the present invention, a catalyst loading quantity is in a range from 0.010% to 40%. Preferably, the catalyst loading quantity is in a range from 0.10% to 20%. Further preferably, the catalyst loading quantity is in a range from 0.50% to 10%.

In one embodiment of the present invention, a grain diameter of the catalyst is in a range from 0.2 nm to 1.5 μm.

In one embodiment of the present invention, the reaction gas is at least one selected from a group consisting of $CO_2$, $H_2O$, $H_2$, $N_2O$, $NO$ and $NO_2$.

In one embodiment of the present invention, a reaction temperature of reacting the graphite material loading the catalyst with a reaction gas is in a range from 500° C. to 1500° C. Preferably, the reaction temperature of reacting the graphite material loading the catalyst with a reaction gas is in a range from 700° C. to 1200° C.

In one embodiment of the present invention, a reaction period of reacting the graphite material loading the catalyst with a reaction gas is in a range from 0.5 hours to 50 hours.

The present invention further provides a lithium-ion battery including a graphite negative material. The graphite negative material includes a number of graphite layers parallel to each other. A number of channels are through the graphite layers. The channels are capable of allowing lithium ions to pass therethrough freely.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
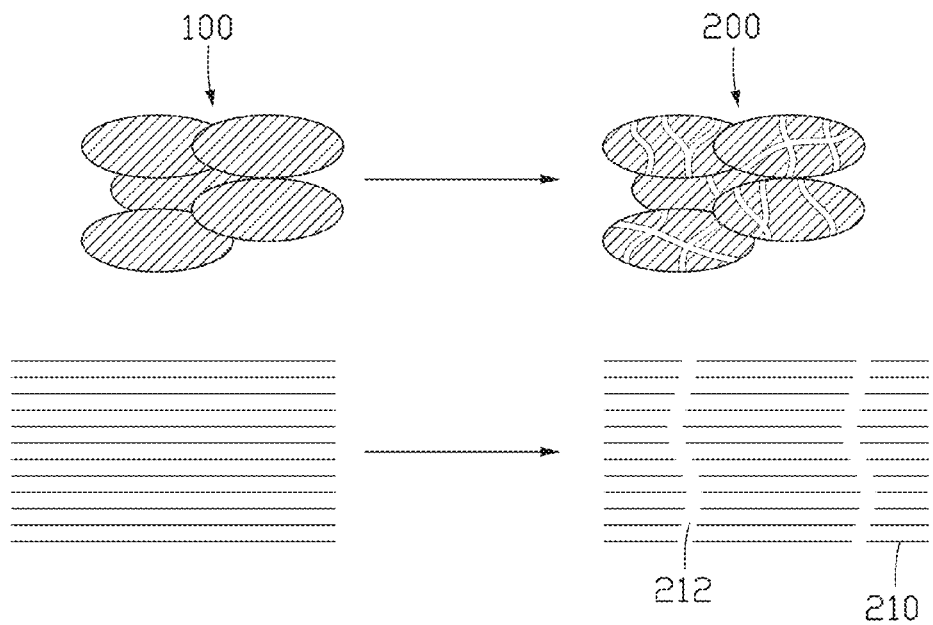
FIG. 1 illustrates schematic views of a graphite material and a graphite negative material in accordance with an embodiment of the present invention.

FIG. 1 illustrates schematic views of a graphite material and a graphite negative material in accordance with an embodiment of the present invention. Referring to FIG. 1, a graphite negative material 200 is made of a graphite material 100 and can be used as a negative electrode of a lithium-ion battery. The graphite negative material 200 includes a number of graphite layers 210 parallel to each other. A number of channels 212 are through the graphite layers 210. The channels 212 are capable of allowing lithium ions to pass therethrough freely. A diameter of each of the channels is, for example, in a range from 0.2 nm to 1.5 µm.

A method for preparing the graphite negative material 200 is described as follows. The method includes the following steps.

Step 1), a catalyst is loaded on the graphite material 100 including a number of graphite layers parallel to each other to form a graphite material loading the catalyst.

In detail, at first, a colloidal solution of the catalyst is prepared. The catalyst can include, for example, at least one selected from a group consisting of Ti, Zr, V, Nb, Cr, Mo, W, Mn, Fe, Ru, Co, Rh, Ir, Ni, Pd, Pt, Cu, Ag, Au, Zn, Gd, Na, K, Mg, Ca, Sr, Ba, Al, Ga, In, Sn, Sb, Bi and a compound thereof. Preferably, the catalyst can include at least one selected from a group consisting of Ti, Zr, V, Nb, Cr, Mo, W, Mn, Fe, Ru, Co, Rh, Ir, Ni, Pd, Pt, Cu, Ag, Au, Zn, Gd and a compound thereof. Further preferably, the catalyst can include at least one selected from a group consisting of Mn, Fe, V, Zn, Co, Cu, Ni and a compound thereof. The compound can be, for example, oxide, hydroxide, halide, nitrate, sulfate, carbonate, metallic acid salt and organic acid salt. A grain diameter of the catalyst is in a range from 0.2 nm to 1.5 µm. A catalyst loading quantity is in a range from 0.010% to 40%. Preferably, the catalyst loading quantity is in a range from 0.10% to 20%. Further preferably, the catalyst loading quantity is in a range from 0.50% to 10%. The catalyst loading quantity refers to a weight percentage of the catalyst to the catalyst and graphite. In one embodiment, the catalyst includes nanometer metal containing at least one selected from a group consisting of Co, Rh, Ir, Ni, Pd, Pt, Cu, Ag and Au, and thus a nanometer metal colloidal solution of the catalyst is prepared. In another embodiment, the catalyst includes at least a compound of metal selected from a group consisting of Ti, Zr, V, Nb, Cr, Mo, W, Mn, Fe, Ru, Zn and Gd. The compound is a nanometer oxide or nanometer hydroxide. And thus, a nanometer compound colloidal solution of the catalyst is prepared.

And then, the graphite material 100 is added into the colloidal solution to obtain a mixture. The graphite material 100 can be, for example, natural graphite, artificial graphite, graphitized meso-carbon microbead (MCMB) and modified graphite. Thereafter, the mixture is dried so as to form the graphite material loading the catalyst. The mixture can be dried by an oven drying method, a spray drying method or a vacuum drying method.

Step 2), the graphite material loading the catalyst is reacted with a reaction gas to transform the carbon of the graphite material to a gaseous product, and to form a number of channels through the graphite layers, thereby forming the graphite negative material 200.

In detail, the reaction gas can be a gas that can react with the graphite material by the catalysis of the catalyst to generate a gaseous product. For example, the reaction gas can be, but not limited to, at least one selected from a group consisting of $CO_2$, $H_2O$, $H_2$, $N_2O$, NO and $NO_2$. A flow rate of the reaction gas is determined by an amount of the graphite material, a pore (or channel) density, an average pore depth, an average pore diameter and other parameters. Preferably, during the reaction of the graphite material loading the catalyst and the reaction gas, an inert gas can be introduced into the reaction device to be used as a diluent gas or a carrier gas. The inert gas is mainly used to help to control the reaction conditions. The dilution gas can be at least one selected from a group consisting of Ar, $N_2$ and He.

The reaction equations (1) to (6) show the reactions of the graphite material loading the catalyst and the reaction gas (i.e., $CO_2$, $H_2O$, $H_2$, $N_2O$, NO and $NO_2$)

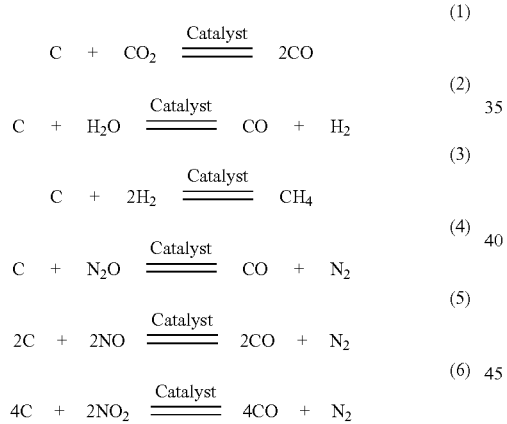

Figure 2:
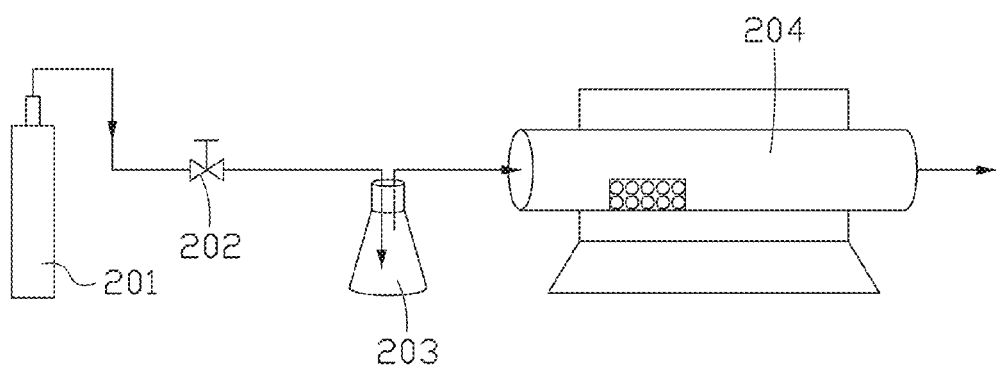
FIG. 2 illustrates a schematic view of a reaction device used in a method for preparing the graphite negative material in accordance with an embodiment of the present invention.
Figure 3:
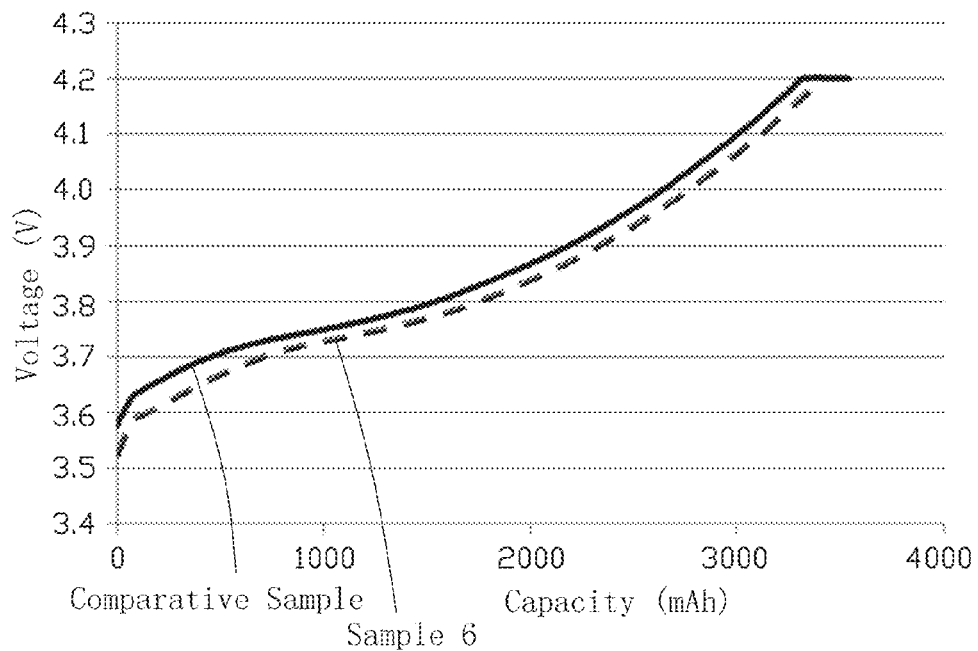
FIG. 3 illustrates a charge curve graph of the lithium-ion battery using the graphite negative material in the example 6 (Sample 6) and the lithium-ion battery using the unprocessed graphite material (Comparative sample) at 45° C. and 3 C charge rate.
Figure 4:
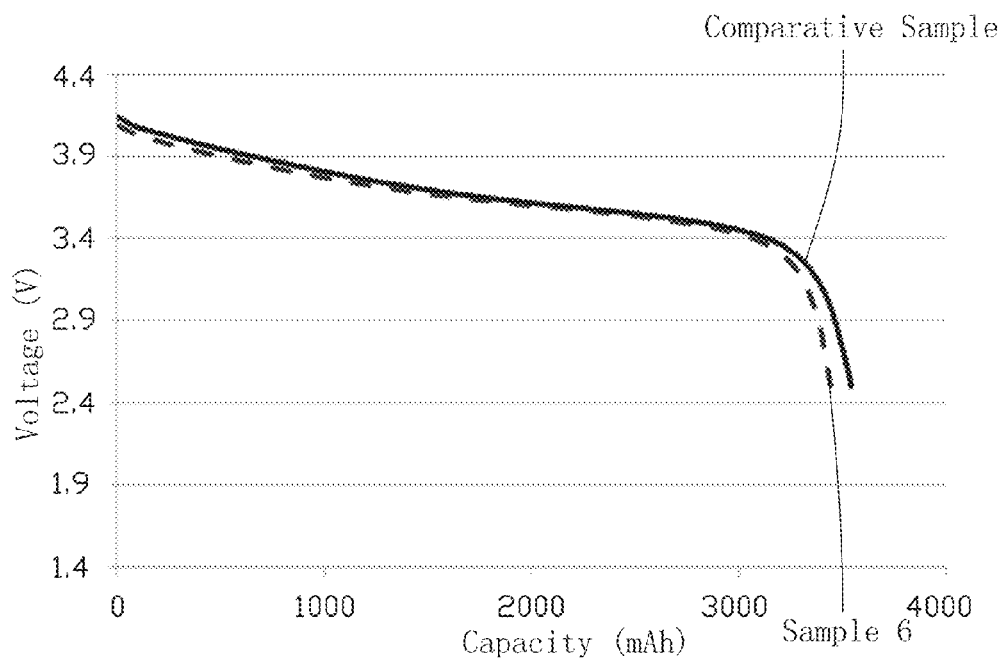
FIG. 4 illustrates a discharge curve graph of the lithium-ion battery using the graphite negative material in the example 6 (Sample 6) and the lithium-ion battery using the unprocessed graphite material (Comparative Sample) at 45° C. and 3 C discharge rate.
Figure 5:
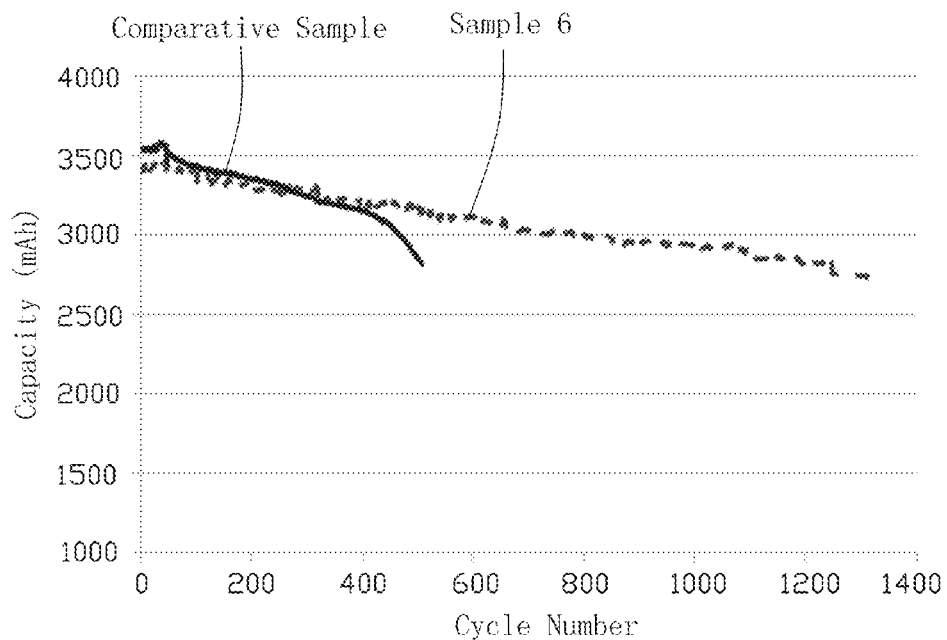
FIG. 5 illustrates a capacity cycle curve graph of the lithium-ion battery using the graphite negative material in the example 6 (Sample 6) and the lithium-ion battery using the unprocessed graphite material (Comparative Sample) at 45° C. and 3 C charge-discharge rate.
Figure 6:
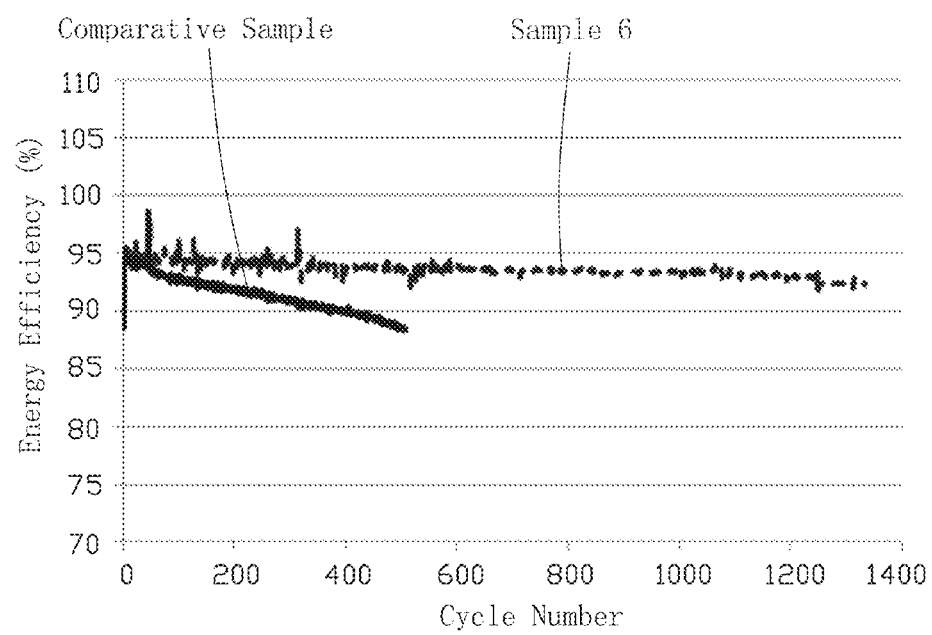
FIG. 6 illustrates an energy efficiency cycle curve graph of the lithium-ion battery using the graphite negative material in the example 6 (Sample 6) and the lithium-ion battery using the unprocessed graphite material (Comparative Sample) at 45° C. and 3 C charge-discharge rate.

The reaction in Step 2) is a gas-solid phase reaction. The reaction device can be a heating reactor capable of introducing the gas thereinto, for example, a fluidized bed reactor, a fixed bed reactor, a tube reactor, and so on. FIG. 2 illustrates a schematic view of a reaction device used in a method for preparing the graphite negative material in accordance with an embodiment of the present invention. Referring to FIG. 2, a reaction device is a tube reactor including a tube furnace 204. The graphite material loading the catalyst is put into the tube furnace 204, and a carrier gas 201 (i.e., high pure argon gas) is also introduced into the tube furnace 204. A flow rate of the carrier gas 201 is controlled by a mass flow controller 202. Deionized water is contained in a conical flask 203. The carrier gas 201 can carry the deionized water into the tube furnace 204. A catalytic reaction of the graphite material loading the catalyst and the reaction gas is conducted in the tube furnace 204. A reaction temperature of the reaction of the graphite material loading the catalyst and the reaction gas is in a range from 500° C. to 1500° C. Preferably, the reaction temperature of the reaction of the graphite material loading the catalyst and the reaction gas is in a range from 700° C. to 1200° C. In fact, the reaction temperature is determined by the types of the catalyst and the reaction gas. A reaction pressure of the reaction of the graphite material loading the catalyst and the reaction gas is in a range from 0.10 atmospheres to 10 atmospheres. A reaction period of the reaction of the graphite material loading the catalyst and the reaction gas is in a range from 0.5 hours to 50 hours.

In the method for preparing the graphite negative material 200, the catalyst in the form of nano-particles is loaded on the surface of the graphite material 100. In a condition of high temperature and the action of the catalyst, the graphite material 100 loading the catalyst react with one or more reaction gas to generate a carbon-containing gas. Thus, the carbon of portions of the graphite material 100 in contact with the catalyst is removed, thereby forming a number of channels 212 through the graphite layers. The channels 212 are capable of allowing lithium ions to pass therethrough freely.

The graphite negative material 200 can be used as a negative electrode material of a lithium ion battery.

Generally, a conventional graphite material including the natural graphite and the artificial graphite are constituted by a number of lamellar graphite. During preparing the natural graphite and the artificial graphite, a carbon source material is usually processed at a temperature in a range of 1600~3000° C. For example, a carbon negative material is formed by the natural graphite and/or the tar. The grown graphite layers are complete. Because there are almost no pores or channels through the graphite layer, the high rate charge-discharge performance of a lithium-ion battery using the conventional graphite material is not good. The graphite negative material 200 of the present invention includes a number of channels 212 through the graphite layer 210. The channels 212 are capable of allowing lithium ions to pass therethrough freely. Thus, the diffusion distance of the lithium ions in the graphite layers 210 is shortened, thereby improving the high rate charge-discharge performance and increasing the cycle life of the lithium-ion battery. Thus, the lithium-ion battery using the graphite negative material 200 can meet requirements of electric vehicles and electric tools.

EXAMPLE 1

10.0 g $Co(NO_3)_2.6H_2O$ are dissolved in 1500.0 g deionized water, and then 1000.0 g graphite (an initial BET specific surface area of the graphite is 1.9 m$^2$/g) are added to form a mixture. The mixture is stirred for about 1 hour, and then the mixture is put at room temperature for about 12 hours. Thereafter, the mixture is displaced in an oven to be dried at 120° C. for about 24 hours, thereby obtaining the graphite material loading the cobalt nitrate. 400 g of the graphite material loading the cobalt nitrate are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 42.0 ml/h. After that, the graphite material loading the cobalt nitrate react with the gaseous deionized water in the tube furnace for about 12 hours at 850° C. After the reaction of the graphite material loading the cobalt nitrate and the gaseous deionized water, a reaction product is cooled down to the room temperature naturally to obtain the graphite negative material. A weight of the graphite negative material is 316 g, a BET specific surface area of the graphite negative material is 4.3 m$^2$/g.

EXAMPLE 2

80.0 g $Ni(NO_3)_2 \cdot 6H_2O$ are dissolved in 3500.0 g deionized water, and then 1500.0 g graphite (an initial BET specific surface area of the graphite is 1.9 $m^2/g$) are added to form a mixture. The mixture is stirred for about 1 hour, and then the mixture is dried by a spray drying method, thereby obtaining the graphite material loading the nickel nitrate. 400 g of the graphite material loading the nickel nitrate are put into the tube furnace, and high pure nitrogen is also introduced into the tube furnace. After 30 minutes, a reaction temperature is up to 750° C. by a heating rate of the tube furnace 5° C./min. And then, the deionized water is pumped into the tube furnace by a rate of 70.0 ml/h. After that, the graphite material loading the nickel nitrate react with the gaseous deionized water in the tube furnace for about 8 hours at 750° C. After the reaction of the graphite material loading the nickel nitrate and the gaseous deionized water, a reaction product is cooled down to the room temperature naturally to obtain the graphite negative material. A weight of the graphite negative material is 200 g, a BET specific surface area of the graphite negative material is 6.1 $m^2/g$.

EXAMPLE 3

10.0 g $Cu(NO_3)_2 \cdot 3H_2O$ are dissolved in 1500.0 g deionized water, and then 1000.0 g graphite (an initial BET specific surface area of the graphite is 1.9 $m^2/g$) are added to form a mixture. The mixture is stirred for about 1 hour, and then the mixture is put at room temperature for about 12 hours. Thereafter, the mixture is displaced in an oven to be dried at 120° C. for about 24 hours, thereby obtaining the graphite material loading the cooper nitrate. 400 g of the graphite material loading the copper nitrate are put into the tube furnace, and high pure nitrogen is also introduced into the tube furnace. After 30 minutes, a reaction temperature is up to 900° C. by a heating rate of the tube furnace 5° C./min. And then, the deionized water is pumped into the tube furnace by a rate of 42.0 ml/h. After that, the graphite material loading the copper nitrate react with the gaseous deionized water in the tube furnace for about 12 hours at 900° C. After the reaction of the graphite material loading the copper nitrate and the gaseous deionized water, a reaction product is cooled down to the room temperature naturally to obtain the graphite negative material. A weight of the graphite negative material is 385 g, a BET specific surface area of the graphite negative material is 6.0 $m^2/g$.

EXAMPLE 4

15.0 g $CoCl_2 \cdot 6H_2O$ are dissolved in 1600.0 g ethanol (AR), and then 1500.0 g graphite (an initial BET specific surface area of the graphite is 1.9 $m^2/g$) are added to form a solution A. In addition, 4.97 g sodium borohydride are dissolved in 200 g ethanol (AR) to for a solution B. The solution B is dropped into the solution A in a nitrogen protection gas to form a mixture. The mixture is stirred for about 1 hour and is filtered by a pump filter, and then the mixture is rinsed by deionized water. The rinsed mixture is displaced in an oven to be dried at 120° C. for about 24 hours, thereby obtaining the graphite material loading the cobalt chloride. 400 g of the graphite material loading the cobalt chloride are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 12.0 ml/h. After that, the graphite material loading the cobalt chloride react with the gaseous deionized water in the tube furnace for about 12 hours at 850° C. After the reaction of the graphite material loading the cobalt chloride and the gaseous deionized water, a reaction product is cooled down to the room temperature naturally to obtain the graphite negative material. A weight of the graphite negative material is 370 g, a BET specific surface area of the graphite negative material is 2.2 $m^2/g$.

EXAMPLE 5

15.0 g $CoCl_2 \cdot 6H_2O$ are dissolved in 1600.0 g ethanol (AR), and then 1500.0 g graphite (an initial BET specific surface area of the graphite is 1.9 $m^2/g$) are added to form a solution A. In addition, 4.97 g sodium borohydride are dissolved in 200 g ethanol (AR) to for a solution B. The solution B is dropped into the solution A in a nitrogen protection gas to form a mixture. The mixture is stirred for about 1 hour and is filtered by a pump filter, and then the mixture is rinsed by deionized water. The rinsed mixture is displaced in an oven to be dried at 120° C. for about 24 hours, thereby obtaining the graphite material loading the cobalt chloride. 450 g of the graphite material loading the cobalt chloride are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 42.0 ml/h. After that, the graphite material loading the cobalt chloride react with the gaseous deionized water in the tube furnace for about 12 hours at 850° C. After the reaction of the graphite material loading the cobalt chloride and the gaseous deionized water, a reaction product is cooled down to the room temperature naturally to obtain the graphite negative material. A weight of the graphite negative material is 300 g, a BET specific surface area of the graphite negative material is 3.4 $m^2/g$.

EXAMPLE 6

100.0 g $Ni(NO_3)_2 \cdot 6H_2O$ are dissolved in 2.0 L deionized water and 1.0 L isopropanol to form a solution by an ultrasonic dispersion method. After the $Ni(NO_3)_2 \cdot 6H_2O$ are completely dissolved, 2.00 Kg graphite (an initial BET specific surface area of the graphite is 1.9 $m^2/g$) are added into the solution to form a mixture. The mixture is stirred for about 4 hour, and then the mixture is displaced in an oven to be dried at 120° C., thereby obtaining the graphite material loading the nickel nitrate. The graphite material loading the nickel nitrate are triturated and put into the tube furnace, and argon is also introduced into the tube furnace. At first, the tube furnace remain a temperature of 500° C. for about 4 hours and a flow rate of the argon gas is 20 ml/min. And then, the temperature of the tube furnace is up to 800° C. and remain the temperature of 800° C. for about 24 hours. At the same time, the gaseous water is brought into the tube furnace by argon bubbles, and the flow rate of the argon gas is 99.4 ml/min. After the reaction of the graphite material loading the nickel nitrate and the gaseous water, a reaction product is cooled down to the room temperature naturally to obtain the graphite negative material. A weight of the graphite negative material is 1.78 Kg, a BET specific surface area of the graphite negative material is 3.1 $m^2/g$.

EXAMPLE 7

14.85 g $Ni(NO_3)_2 \cdot 6H_2O$ are dissolved in 3500.0 g deionized water, and then 1500.0 g graphite (an initial BET specific surface area of the graphite is 1.9 m²/g) are added to form a mixture. The mixture is stirred for about 1 hour, and then the mixture is dried by a spray drying method, thereby obtaining the graphite material loading the nickel nitrate. 400 g of the graphite material loading the nickel nitrate are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 6 ml/h. After that, the graphite material loading the nickel nitrate react with the gaseous deionized water in the tube furnace for about 15 hours at 850° C. After the reaction of the graphite material loading the nickel nitrate and the gaseous deionized water, a reaction product is cooled down to the room temperature naturally to obtain the graphite negative material. A weight of the graphite negative material is 365 g, a BET specific surface area of the graphite negative material is 4.0 m²/g.

EXAMPLE 8

20.50 g Fe(NO$_3$)$_3$.9H$_2$O are dissolved in 3500.0 g deionized water, and then 1500.0 g graphite (an initial BET specific surface area of the graphite is 1.9 m²/g) are added to form a mixture. The mixture is stirred for about 1 hour, and then the mixture is dried by a spray drying method, thereby obtaining the graphite material loading the ferric nitrate. 400 g of the graphite material loading the ferric nitrate are put into the tube furnace, and high pure nitrogen is also introduced into the tube furnace. After 30 minutes, a reaction temperature is up to 900° C. by a heating rate of the tube furnace 5° C./min. And then, the deionized water is pumped into the tube furnace by a rate of 6 ml/h. After that, the graphite material loading the ferric nitrate react with the gaseous deionized water in the tube furnace for about 15 hours at 900° C. After the reaction of the graphite material loading the ferric nitrate and the gaseous deionized water, a reaction product is cooled down to the room temperature naturally to obtain the graphite negative material. A weight of the graphite negative material is 333 g, a BET specific surface area of the graphite negative material is 3.1 m²/g.

EXAMPLE 9

15.02 g Zn(NO$_3$)$_2$.6H$_2$O are dissolved in 3500.0 g deionized water, and then 1500.0 g graphite (an initial BET specific surface area of the graphite is 1.9 m²/g) are added to form a mixture. The mixture is stirred for about 1 hour, and then the mixture is dried by a spray drying method, thereby obtaining the graphite material loading the zinc nitrate. 400 g of the graphite material loading the zinc nitrate are put into the tube furnace, and high pure nitrogen is also introduced into the tube furnace. After 30 minutes, a reaction temperature is up to 950° C. by a heating rate of the tube furnace 5° C./min. And then, the deionized water is pumped into the tube furnace by a rate of 6 ml/h. After that, the graphite material loading the zinc nitrate react with the gaseous deionized water in the tube furnace for about 10 hours at 950° C. After the reaction of the graphite material loading the zinc nitrate and the gaseous deionized water, a reaction product is cooled down to the room temperature naturally to obtain the graphite negative material. A weight of the graphite negative material is 374 g, a BET specific surface area of the graphite negative material is 7.0 m²/g.

EXAMPLE 10

12.37 g MnC$_4$H$_6$O$_4$.4H$_2$O are dissolved in 3500.0 g deionized water, and then 1500.0 g graphite (an initial BET specific surface area of the graphite is 1.9 m²/g) are added to form a mixture. The mixture is stirred for about 1 hour, and then the mixture is dried by a spray drying method, thereby obtaining the graphite material loading the manganese acetate. 400 g of the graphite material loading the manganese acetate are put into the tube furnace, and high pure nitrogen is also introduced into the tube furnace. After 30 minutes, a reaction temperature is up to 900° C. by a heating rate of the tube furnace 5° C./min. And then, the deionized water is pumped into the tube furnace by a rate of 6 ml/h. After that, the graphite material loading the manganese acetate react with the gaseous deionized water in the tube furnace for about 15 hours at 900° C. After the reaction of the graphite material loading the manganese acetate and the gaseous deionized water, a reaction product is cooled down to the room temperature naturally to obtain the graphite negative material. A weight of the graphite negative material is 379 g, a BET specific surface area of the graphite negative material is 4.8 m²/g.

EXAMPLE 11

14.70 g Co(NO$_3$)$_2$.6H$_2$O are dissolved in 3500.0 g deionized water, and then 1500.0 g graphite (an initial BET specific surface area of the graphite is 1.9 m²/g) are added to form a mixture. The mixture is stirred for about 1 hour, and then the mixture is dried by a spray drying method, thereby obtaining the graphite material loading the cobalt nitrate. 400 g of the graphite material loading the cobalt nitrate are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 6 ml/h. After that, the graphite material loading the zinc nitrate react with the gaseous deionized water in the tube furnace for about 15 hours at 850° C. After the reaction of the graphite material loading the cobalt nitrate and the gaseous deionized water, a reaction product is cooled down to the room temperature naturally to obtain the graphite negative material. A weight of the graphite negative material is 336 g, a BET specific surface area of the graphite negative material is 4.4 m²/g.

EXAMPLE 12

0.173 g platinum chloride are dissolved in 37.5 deionized water, and then 25.0 g graphite (an initial BET specific surface area of the graphite is 1.9 m²/g) are added to form a mixture. The mixture is stirred for about 1 hour, and then the mixture is put at the room temperature for about 12 hours. Thereafter, the mixture is displaced in an oven to be dried at 120° C. for about 12 hours, thereby obtaining the graphite material loading the platinum chloride. 5.00 g of the graphite material loading the platinum chloride are put into the tube furnace, and high pure nitrogen is also introduced into the tube furnace. After 30 minutes, a reaction temperature is up to 1000° C. by a heating rate of the tube furnace 5° C./min. At this time, a hydrogen gas is introduced into the tube furnace by a flow rate of 100 ml/min. The graphite material loading the platinum chloride react with hydrogen in the tube furnace for about 10 hours at 1000° C. After the reaction of the graphite material loading the platinum chloride and hydrogen, a reaction product is cooled down to the room temperature naturally to obtain the graphite negative material. A weight of the graphite negative material is 4.43 g, a BET specific surface area of the graphite negative material is 8.6 m²/g.

EXAMPLE 13

0.173 g ruthenium chloride are dissolved in 37.5 deionized water, and then 25.0 g graphite (an initial BET specific surface area of the graphite is 1.9 m$^2$/g) are added to form a mixture. The mixture is stirred for about 1 hour, and then the mixture is put at the room temperature for about 12 hours. Thereafter, the mixture is displaced in an oven to be dried at 120° C. for about 12 hours, thereby obtaining the graphite material loading the ruthenium chloride. 5.00 g of the graphite material loading the ruthenium chloride are put into the tube furnace, and high pure nitrogen is also introduced into the tube furnace. After 30 minutes, a reaction temperature is up to 1000° C. by a heating rate of the tube furnace 5° C./min. At this time, a hydrogen gas is introduced into the tube furnace by a flow rate of 100 ml/min. The graphite material loading the ruthenium chloride react with hydrogen in the tube furnace for about 10 hours at 1000° C. After the reaction of the graphite material loading the ruthenium chloride and hydrogen, a reaction product is cooled down to the room temperature naturally to obtain the graphite negative material. A weight of the graphite negative material is 4.27 g, a BET specific surface area of the graphite negative material is 10.7 m$^2$/g.

EXAMPLE 14

69.03 g 5 nCl$_2$.2H$_2$O are dissolved in 3500.0 g deionized water, and then 1500.0 g graphite (an initial BET specific surface area of the graphite is 1.9 m$^2$/g) are added to form a mixture. The mixture is stirred for about 1 hour, and then the mixture is dried by a spray drying method, thereby obtaining the graphite material loading the tin protochloride. 400 g of the graphite material loading the tin protochloride are put into the tube furnace, and high pure nitrogen is also introduced into the tube furnace. After 30 minutes, a reaction temperature is up to 900° C. by a heating rate of the tube furnace 5° C./min. And then, the deionized water is pumped into the tube furnace by a rate of 12 ml/h. After that, the graphite material loading the tin protochloride react with the gaseous deionized water in the tube furnace for about 15 hours at 900° C. After the reaction of the graphite material loading the tin protochloride and the gaseous deionized water, the deionized water is stopped and keep the condition for 1 hours, and then a reaction product is cooled down to the room temperature naturally to obtain the graphite negative material. A weight of the graphite negative material is 370.3 g, a BET specific surface area of the graphite negative material is 4.8 m$^2$/g.

EXAMPLE 15

5.85 g NH$_4$VO$_3$ are dissolved in 3500.0 g deionized water at 60° C., and then 1500.0 g graphite (an initial BET specific surface area of the graphite is 1.9 m$^2$/g) are added to form a mixture. The mixture is stirred for about 1 hour, and then the mixture is dried by a spray drying method, thereby obtaining the graphite material loading the ammonium metavanadate. 400 g of the graphite material loading the ammonium metavanadate are put into the tube furnace, and high pure nitrogen is also introduced into the tube furnace. After 30 minutes, a reaction temperature is up to 900° C. by a heating rate of the tube furnace 5° C./min. And then, the deionized water is pumped into the tube furnace by a rate of 12 ml/h. After that, the graphite material loading the ammonium metavanadate react with the gaseous deionized water in the tube furnace for about 15 hours at 900° C. After the reaction of the graphite material loading the ammonium metavanadate and the gaseous deionized water, the deionized water is stopped and then a reaction product is cooled down to the room temperature naturally to obtain the graphite negative material. A weight of the graphite negative material is 380.2 g, a BET specific surface area of the graphite negative material is 7.0 m$^2$/g.

EXAMPLE 16

14.85 g Ni(NO$_3$)$_2$.6H$_2$O are dissolved in 3500.0 g deionized water, and then 1500.0 g graphite (an initial BET specific surface area of the graphite is 1.9 m$^2$/g) are added to form a mixture. The mixture is stirred for about 1 hour, and then the mixture is dried by a spray drying method, thereby obtaining the graphite material loading the nickel nitrate. 400 g of the graphite material loading the nickel nitrate are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 12 ml/h. After that, the graphite material loading the nickel nitrate react with the gaseous deionized water in the tube furnace for about 15 hours at 900° C. After the reaction of the graphite material loading the nickel nitrate and the gaseous deionized water, the deionized water is stopped and then a reaction product is cooled down to the room temperature naturally to obtain the graphite negative material. A weight of the graphite negative material is 302.3 g, a BET specific surface area of the graphite negative material is 4.3 m$^2$/g.

EXAMPLE 17

14.85 g Ni(NO$_3$)$_2$.6H$_2$O are dissolved in 3500.0 g deionized water, and then 1500.0 g graphite (an initial BET specific surface area of the graphite is 1.9 m$^2$/g) are added to form a mixture. The mixture is stirred for about 1 hour, and then the mixture is dried by a spray drying method, thereby obtaining the graphite material loading the nickel nitrate. 400 g of the graphite material loading the nickel nitrate are put into the tube furnace, and high pure nitrogen is also introduced into the tube furnace. After 30 minutes, a reaction temperature is up to 850° C. by a heating rate of the tube furnace 5° C./min. And then, the deionized water is pumped into the tube furnace by a rate of 6 ml/h. After that, the graphite material loading the nickel nitrate react with the gaseous deionized water in the tube furnace for about 15 hours at 900° C. After the reaction of the graphite material loading the nickel nitrate and the gaseous deionized water, the deionized water is stopped and then a reaction product is cooled down to the room temperature naturally to obtain the graphite negative material. A weight of the graphite negative material is 365 g, a BET specific surface area of the graphite negative material is 3.8 m$^2$/g. The graphite negative material is washed by dilute hydrochloric acid to remove nickel metal and then washed three times by deionized water. The BET specific surface area of the resulted material is 3.6 m$^2$/g.

EXAMPLE 18

12.2 g Cu(NO$_3$)$_2$.3H$_2$O are dissolved in 1500.0 g deionized water, and then 1000.0 g graphite (an initial BET specific surface area of the graphite is 1.9 m$^2$/g) are added to form a mixture. The mixture is stirred for about 1 hour, and then the mixture is put at the room temperature for about 12 hours. Thereafter, the mixture is displaced in an oven to be dried at 120° C. for about 12 hours, thereby obtaining the graphite material loading the copper nitrate. 400 g of the graphite material loading the copper nitrate are put into the tube furnace, and high pure nitrogen is also introduced into the tube furnace. After 30 minutes, a reaction temperature is up to 950° C. by a heating rate of the tube furnace 5° C./min. And then, the deionized water is pumped into the tube furnace by a rate of 12 ml/h. After that, the graphite material loading the copper nitrate react with the gaseous deionized water in the tube furnace for about 15 hours at 950° C. After the reaction of the graphite material loading the copper nitrate and the gaseous deionized water, the deionized water is stopped and then a reaction product is cooled down to the room temperature naturally to obtain the graphite negative material. A weight of the graphite negative material is 370 g, a BET specific surface area of the graphite negative material is 8.0 m²/g.

EXAMPLE 19

3.53 g ammonium molybdate are dissolved in 260.0 g deionized water, and then 100.0 g graphite (an initial BET specific surface area of the graphite is 1.9 m²/g) are added to form a mixture. The mixture is stirred for about 1 hour, and then the mixture is dried by a spray drying method, thereby obtaining the graphite material loading the ammonium molybdate (also as 0.24% Mo). 5.0 g of the graphite material loading the ammonium molybdate are put into the tube furnace, and high pure nitrogen is also introduced into the tube furnace. After 40 minutes, a reaction temperature is up to 900° C. by a heating rate of the tube furnace 5° C./min. And then, the deionized water is pumped into the tube furnace by a rate of 0.2 ml/h. After that, the graphite material loading the ammonium molybdate react with the gaseous deionized water in the tube furnace for about 15 hours at 950° C. After the reaction of the graphite material loading the ammonium molybdate and the gaseous deionized water, the deionized water is stopped and then a reaction product is cooled down to the room temperature naturally to obtain the graphite negative material. A weight of the graphite negative material is 4.4 g, a BET specific surface area of the graphite negative material is 5.8 m²/g.

A lithium-ion battery using the graphite negative material in the above examples can be manufactured by the following steps. At first, a negative electrode material slurry is prepared by mixing the graphite negative material, an adhesive such as polyvinylidene difluoride (PVDF) and a conductive material with a dispersion agent such as N-methyl-2-pyrrolidone (NMP). A weight proportion of the graphite negative material, an adhesive such as polyvinylidene difluoride (PVDF) and a conductive material such as carbon black is equal to 8:1:1. Then, the negative electrode material slurry is coated on a copper foil uniformly. After the copper foil coated with the negative electrode material slurry is dried in a vacuum condition, the copper foil coated with the graphite negative material is rolled to a negative electrode plate. In addition, a positive electrode material slurry is prepared by mixing the positive material such as ternary lithium nickel cobalt manganese oxide (Ni:Co:Mn=3:3:3), an adhesive such as polyvinylidene difluoride (PVDF) and a conductive material with a dispersion agent such as N-methyl-2-pyrrolidone(NMP). A weight proportion of the graphite negative material, an adhesive such as polyvinylidene difluoride (PVDF) and a conductive material such as carbon black is equal to 8:1:1. Then, the positive electrode material slurry is coated on a aluminum foil uniformly. After the aluminum foil coated with the positive electrode material slurry is dried in a vacuum condition, the aluminum foil coated with the positive material is rolled to a positive electrode plate. An electrolyte is a mixing solution of $LiPF_6$, ethylene carbonate (EC), dimethyl carbonate (DMC) and ethylmethyl carbonate (EMC). A molar concentration of the $LiPF_6$ is 1 mol/L. A volume proportion of the EC, DMC and EMC is 1:1:1. A separator is a poly(propylene) microporous membrane. The negative electrode plate, the positive electrode plate, the electrolyte and the separator are assembled to form soft-package lithium ion battery with a capacity of 3 Ah.

As a comparative example, a lithium-ion battery using the unprocessed graphite material (an initial BET specific surface area of the graphite is 1.9 m²/g) is also manufactured by the abovementioned steps.

The lithium-ions batteries are tested by a constant current charge-discharge process at 45° C. The constant current is, for example, 9000 mA or 18000 mA. That is, the lithium-ions batteries are charged at 3C charge rate and are discharged at 3C discharge rate (3CC3CD), or charged at 6C charge rate and are discharged at 6C discharge rate 6CC6CD), and a charge-discharge voltage range is 4.2~2.5V.

Referring to FIG. 3, FIG. 4, FIG. 5 and FIG. 6, the tested lithium-ions batteries are the lithium-ion battery using the graphite negative material in the example 6 (Sample 6) and the lithium-ion battery using the unprocessed graphite material (Comparative Sample). The lithium-ions batteries of the Sample 6 and the Comparative Sample are charged at 3C charge rate at 45° C. and are discharged at 3C discharge rate at 45° C. A charge plateau of the Sample 6 is significantly lower than the charge plateau of the Comparative Sample, and a discharge plateau of the Sample 6 is substantially leveled with a discharge plateau of the Comparative Sample. A charge-discharge cycle life of the Sample 6 is longer than a charge-discharge cycle life of the Comparative Sample at high temperature (45° C.) and high charge-discharge rate (3CC3CD). An energy efficiency of the Sample 6 is greater than an energy efficiency of the Comparative Sample.

Figure 7:
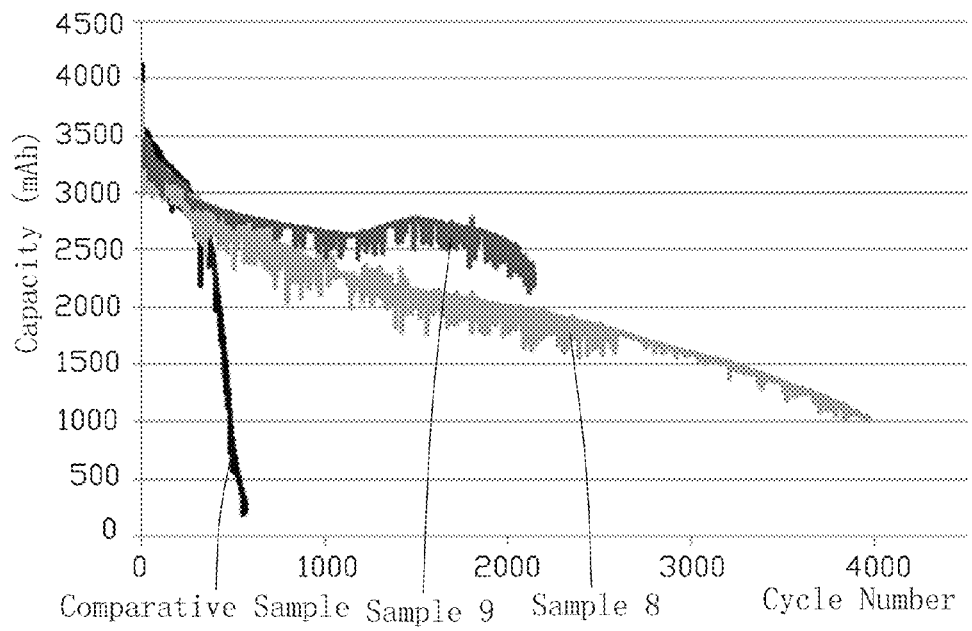
FIG. 7 illustrates a capacity cycle curve graph of the lithium-ion battery using the graphite negative material in the example 8 (Sample 8), the lithium-ion battery using the graphite negative material in the example 9 (Sample 9) and the lithium-ion battery using the unprocessed graphite material (Comparative Sample) at 45° C. and 6 C charge-discharge rate.
Figure 8:
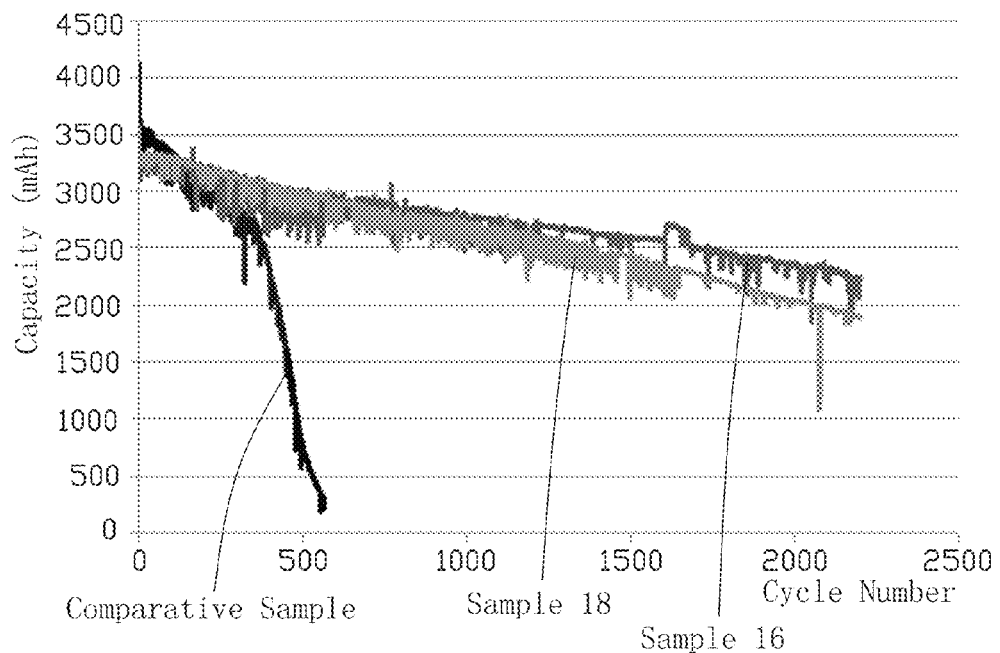
FIG. 8 illustrates a capacity cycle curve graph of the lithium-ion battery using the graphite negative material in the example 16 (Sample 16), the lithium-ion battery using the graphite negative material in the example 18 (Sample 18) and the lithium-ion battery using the unprocessed graphite material (Comparative Sample) at 45° C. and 6 C charge-discharge rate.
Figure 9:
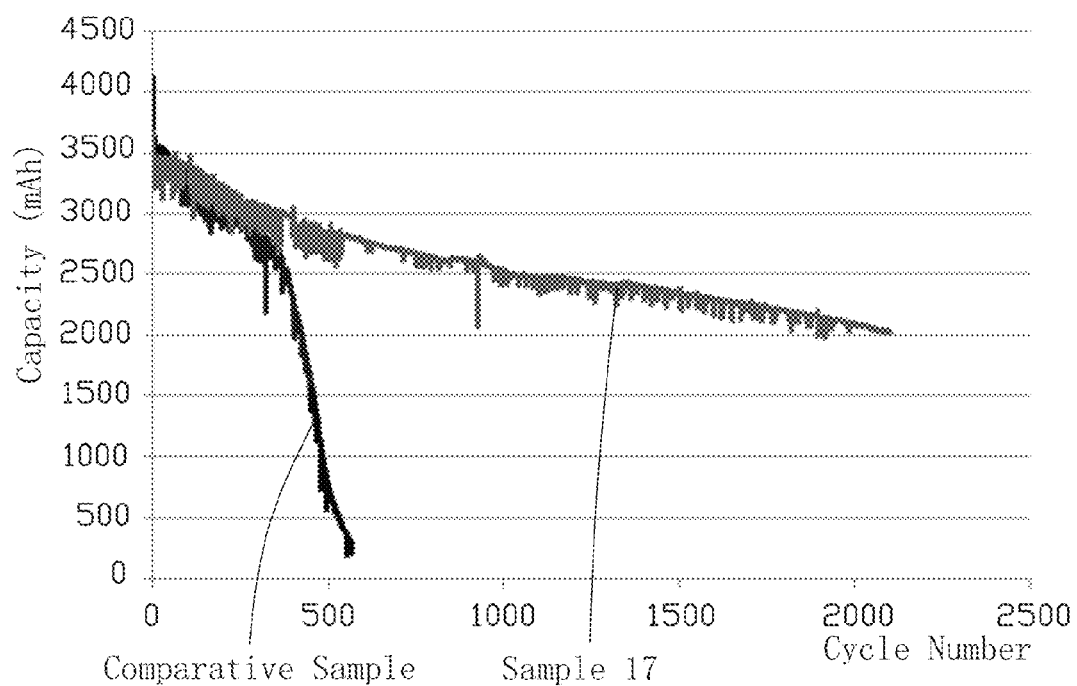
FIG. 9 illustrates a capacity cycle curve graph of the lithium-ion battery using the graphite negative material in the example 17 (Sample 17) and the lithium-ion battery using the unprocessed graphite material (Comparative Sample) at 45° C. and 6 C charge-discharge rate.
Figure 10:
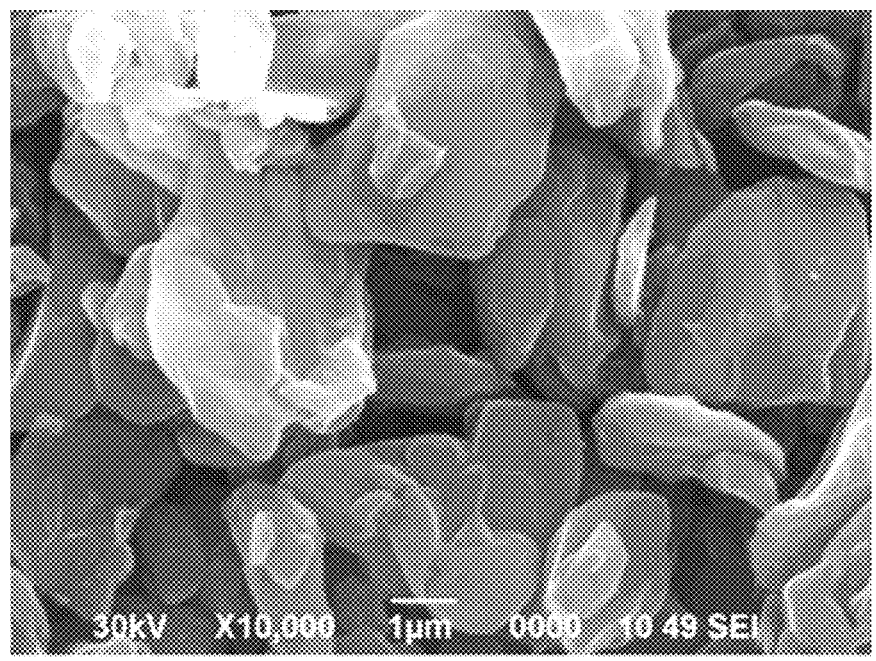
FIG. 10 illustrates a scanning electron microscope (SEM) image of the unprocessed graphite material.
Figure 11:
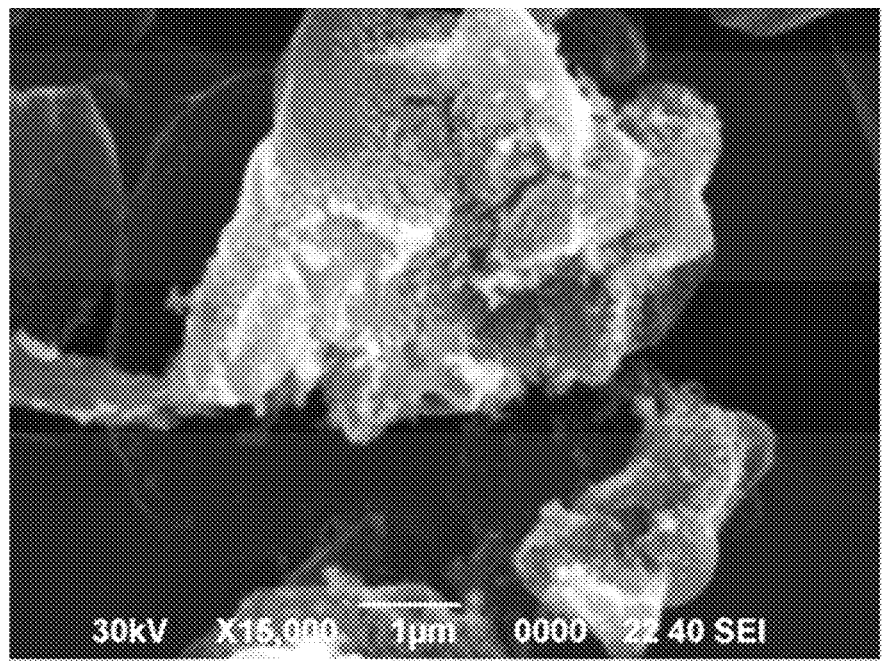
FIG. 11 illustrates a scanning electron microscope (SEM) image of the graphite negative material in the example 2 in accordance with the present invention, which is baked at 700° C. and has not reacted with the reaction gas.
Figure 12:
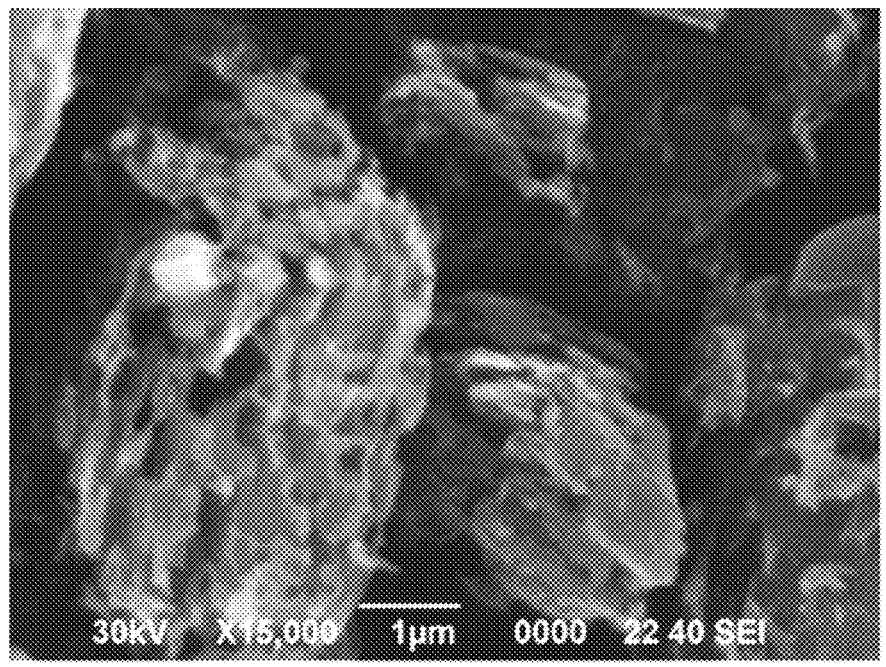
FIG. 12 illustrates a scanning electron microscope (SEM) image of the graphite negative material in the example 2 in accordance with the present invention.
Figure 13:
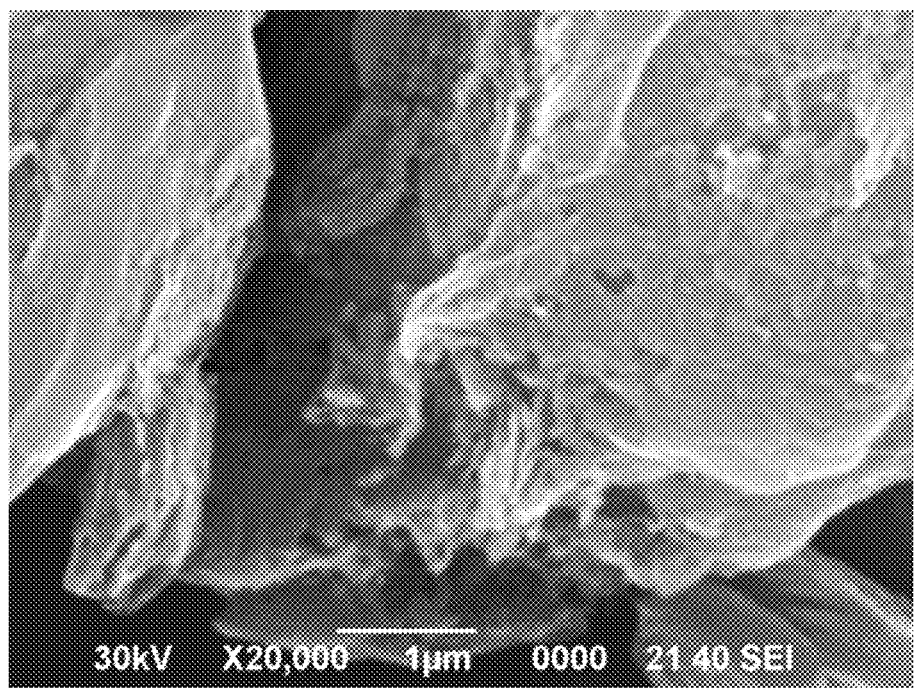
FIG. 13 illustrates a scanning electron microscope (SEM) image of the graphite negative material in the example 13 in accordance with the present invention.

Referring to FIG. 7, FIG. 8 and FIG. 9, the tested lithium-ions batteries are the lithium-ion battery using the graphite negative material in the example 8 (Sample 8), the lithium-ion battery using the graphite negative material in the example 9 (Sample 9), the lithium-ion battery using the graphite negative material in the example 16 (Sample 16), the lithium-ion battery using the graphite negative material in the example 17 (Sample 17), the lithium-ion battery using the graphite negative material in the example 18 (Sample 18) and the lithium-ion battery using the unprocessed graphite material (Comparative Sample). The lithium-ions batteries of the Sample 8, the Sample 9, the Sample 16, the Sample 17, the Sample 18 and the Comparative Sample are charged at 6C charge rate at ° C. and are discharged at 6C discharge rate at 45° C. A charge-discharge cycle life of the Sample 8, or the Sample 9, or the Sample 16, or the Sample 17, or the Sample 18 is significantly longer than a charge-discharge cycle life of the Comparative Sample at high temperature (45° C.) and high charge-discharge rate (6CC6CD). The lithium-ions battery of the Sample 17, of which the graphite negative material is washed by dilute hydrochloric acid to remove nickel metal, has longer cycle life at high temperature (45° C.) and high charge-discharge rate (6CC6CD). It sufficiently shows the contribution of the channels of the graphite material to long cycle life at high charge-discharge rate.

The unprocessed graphite material, the graphite material loading the nickel nitrate in the example 2 that is baked at 700° C., the graphite negative material in the example 2, the graphite negative material in the example 13 and are tested by a scanning electron microscope (SEM) method. FIG. 10, FIG. 11, FIG. 12 and FIG. 13 respectively illustrate a scanning electron microscope (SEM) image of the abovementioned graphite negative material. Referring to FIG. 10 to FIG. 13, before the high-temperature catalytic reaction, the nanometer or sub-micron catalyst particles are uniformly distributed on the surface of the graphite material. After the high-temperature catalytic reaction, an "etching" phenomenon of the surface of the graphite material appears so as to form a number of pore structures, and most of the sub-micron catalyst particles are disappeared.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing a graphite negative material for an electrode of a lithium-ion battery, comprising:
    loading a catalyst on the surface of a graphite material comprising a plurality of graphite layers to form a graphite material loaded with the catalyst;
    forming a plurality of channels through the graphite layers of the graphite material loaded with the catalyst by reacting the graphite material loaded with the catalyst with a reaction gas, wherein the carbon carbons of the graphite material in contact with the catalyst are transformed to a gaseous product to be removed, the plurality of channels are capable of allowing lithium ions to pass therethrough freely, and a BET specific surface area of thus-obtained graphite negative material is in the range of 2.2- to 10.7 m2/g;
    wherein the catalyst comprises at least one selected from a group consisting of Ti, Zr, V, Nb, Cr, Mo, W, Mn, Fe, Ru, Co, Rh, Ir, Ni, Pd, Pt, Cu, Ag, Au, Zn, Gd, Na, K, Mg, Ca, Sr, Ba, Al, Ga, In, Sn, Sb, Bi and a compound thereof.

2. The method of claim 1, wherein the graphite material comprises at least one selected from a group consisting of natural graphite, artificial graphite, graphitized meso-carbon microbead and modified graphite.

3. The method of claim 1, wherein the catalyst comprises at least one selected from a group consisting of Ti, Zr, V, Nb, Cr, Mo, W, Mn, Fe, Ru, Co, Rh, Ir, Ni, Pd, Pt, Cu, Ag, Au, Zn, Gd and a compound thereof.

4. The method of claim 1, wherein the catalyst comprises at least one selected from a group consisting of Mn, Fe, V, Zn, Co, Cu, Ni and a compound thereof.

5. The method of claim 1, wherein the compound is at least one selected from a group consisting of oxide, hydroxide, halide, nitrate, sulfate, carbonate, metallic acid salt and organic acid salt.

6. The method of claim 1, wherein a catalyst loading quantity is in a range from 0.010% to 40%.

7. The method of claim 1, wherein a catalyst loading quantity is in a range from 0.10% to 20%.

8. The method of claim 1, wherein a catalyst loading quantity is in a range from 0.50% to 10%.

9. The method of claim 1, wherein a grain diameter of the particles of the catalyst is in a range from 0.2 nm to 1.5 μm.

10. The method of claim 1, wherein the reaction gas is at least one selected from a group consisting of $CO_2$, $H_2O$, $H_2$, $N_2O$, NO and $NO_2$.

11. The method of claim 1, wherein a reaction temperature of reacting the graphite material loading the catalyst with a reaction gas is in a range from 500° C. to 1500° C.

12. The method of claim 1, wherein a reaction temperature of reacting the graphite material loading the catalyst with a reaction gas is in a range from 700° C. to 1200° C.

13. The method of claim 1, wherein a reaction period of reacting the graphite material loading the catalyst with a reaction gas is in a range from 0.5 hours to 50 hours.

* * * * *